(12) United States Patent
Aoshima et al.

(10) Patent No.: US 10,663,645 B2
(45) Date of Patent: May 26, 2020

(54) ILLUMINATION DEVICE AND DISPLAY DEVICE

(71) Applicant: Japan Display Inc., Tokyo (JP)

(72) Inventors: Toji Aoshima, Tokyo (JP); Shiori Akamatsu, Tokyo (JP); Takashi Ota, Tokyo (JP); Tomohisa Onishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/142,837

(22) Filed: Sep. 26, 2018

(65) Prior Publication Data

US 2019/0094454 A1  Mar. 28, 2019

(30) Foreign Application Priority Data

Sep. 28, 2017  (JP) .................................. 2017-189152

(51) Int. Cl.
*F21V 7/04* (2006.01)
*F21V 8/00* (2006.01)

(52) U.S. Cl.
CPC ......... *G02B 6/0086* (2013.01); *G02B 6/0083* (2013.01); *G02B 6/009* (2013.01); *G02B 6/0051* (2013.01); *G02B 6/0055* (2013.01)

(58) Field of Classification Search
CPC .. G02B 6/0086; G02B 6/0083; G02B 6/0051; G02B 6/0055
See application file for complete search history.

(56) References Cited

U.S. PATENT DOCUMENTS

2013/0051073 A1* 2/2013 Park ..................... H05K 1/0209
362/612

FOREIGN PATENT DOCUMENTS

JP  2007304306 A  11/2007

\* cited by examiner

*Primary Examiner* — Matthew J. Peerce
(74) *Attorney, Agent, or Firm* — K&L Gates LLP

(57) ABSTRACT

According to one embodiment, an illumination device includes a light guide, a frame surrounding the light guide, a light emitting unit located between the light guide and the frame, and a wiring substrate electrically connected to the light emitting unit. The wiring substrate includes a convex portion projecting in a first direction as seen in plan view. The frame includes a concave portion facing the convex portion as seen in plan view. The concave portion is spaced apart from the convex portion.

20 Claims, 14 Drawing Sheets

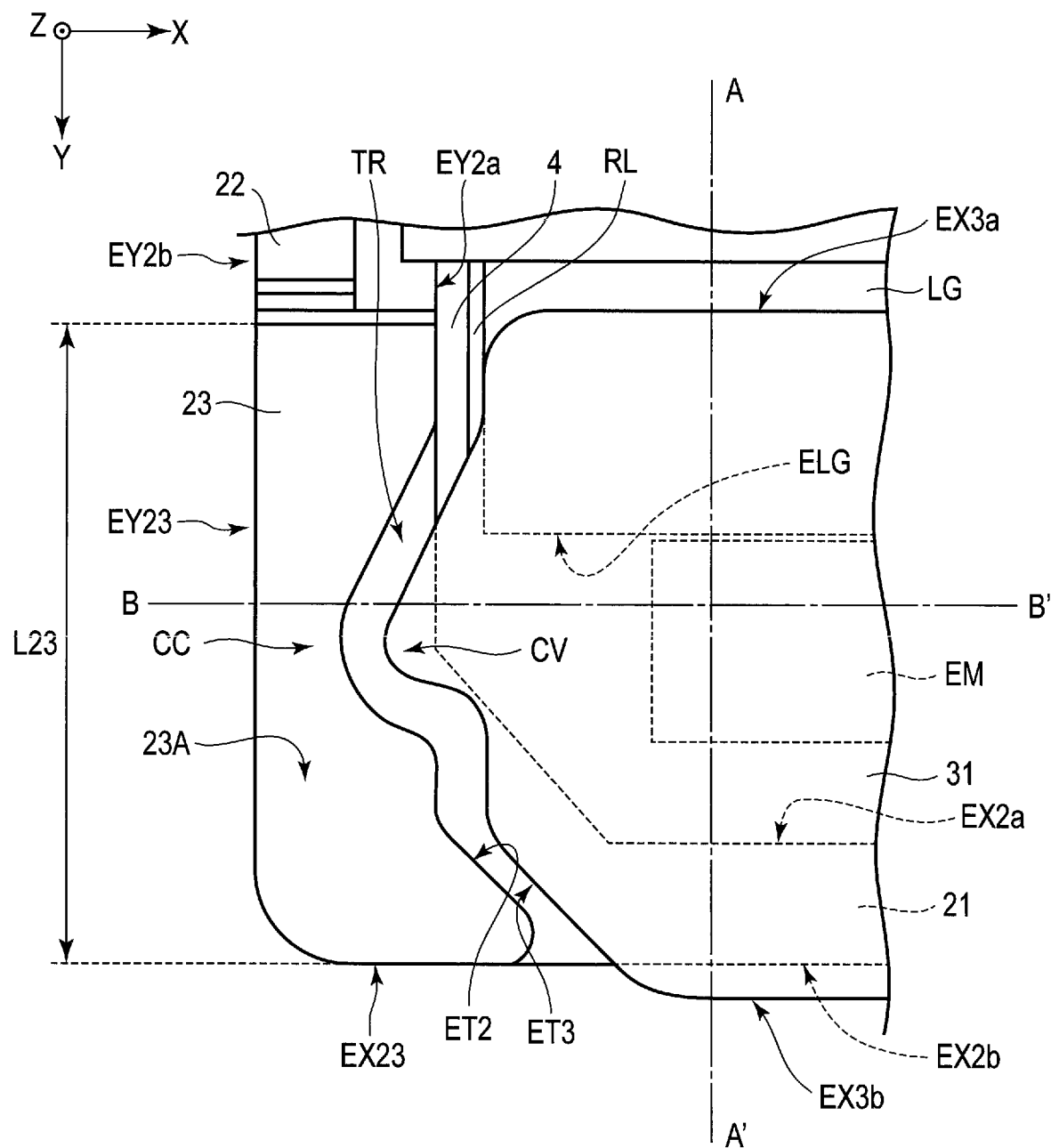
F I G. 7

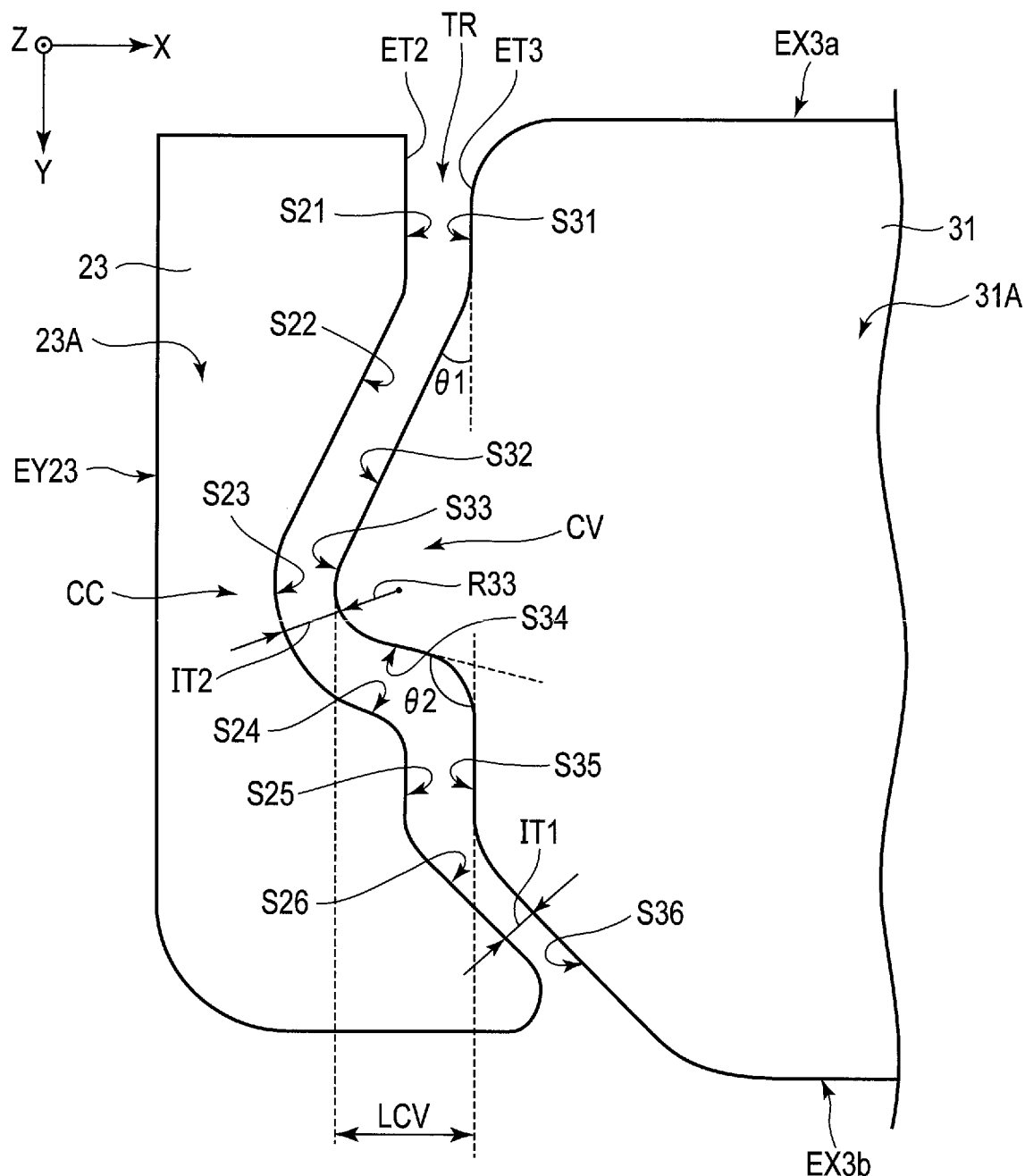
F I G. 8

ILLUMINATION DEVICE AND DISPLAY DEVICE

CROSS-REFERENCE TO RELATED APPLICATIONS

This application is based upon and claims the benefit of priority from Japanese Patent Application No. 2017-189152, filed Sep. 28, 2017, the entire contents of which are incorporated herein by reference.

FIELD

Embodiments described herein relate generally to an illumination device, and a display device comprising an illumination device.

BACKGROUND

Display devices such as liquid crystal display devices may comprise an illumination device. In many cases, the illumination device comprises a frame in which a light emitting unit and a light guide are housed. When a gap is formed between the frame and another component such as a wiring substrate, the gap may be a path for allowing a foreign substance to enter the illumination device.

SUMMARY

The present application generally relates to an illumination device and a display device including an illumination device.

According to an embodiment, an illumination device including a light guide; a frame surrounding the light guide; a light emitting unit located between the light guide and the frame; and a wiring substrate electrically connected to the light emitting unit, wherein the wiring substrate comprises a convex portion projecting in a first direction as seen in plan view, the frame comprises a concave portion facing the convex portion as seen in plan view, and the concave portion is spaced apart from the convex portion.

According to another embodiment, a display device including an illumination device; and a display panel overlapping the illumination device, wherein the illumination device includes a light guide; a frame surrounding the light guide; a light emitting unit located between the light guide and the frame; and a wiring substrate electrically connected to the light emitting unit, the wiring substrate comprises a convex portion projecting in a first direction as seen in plan view, the frame comprises a concave portion facing the convex portion as seen in plan view, and the concave portion is spaced apart from the convex portion.

BRIEF DESCRIPTION OF THE DRAWINGS

FIG. 7 is a plan view in which the vicinity of the rib 23 and the connection portion 31 shown in FIG. 5 is enlarged.

FIG. 8 is a plan view in which the vicinity of the trench TR shown in FIG. 7 is enlarged.

DETAILED DESCRIPTION

Figure 1:
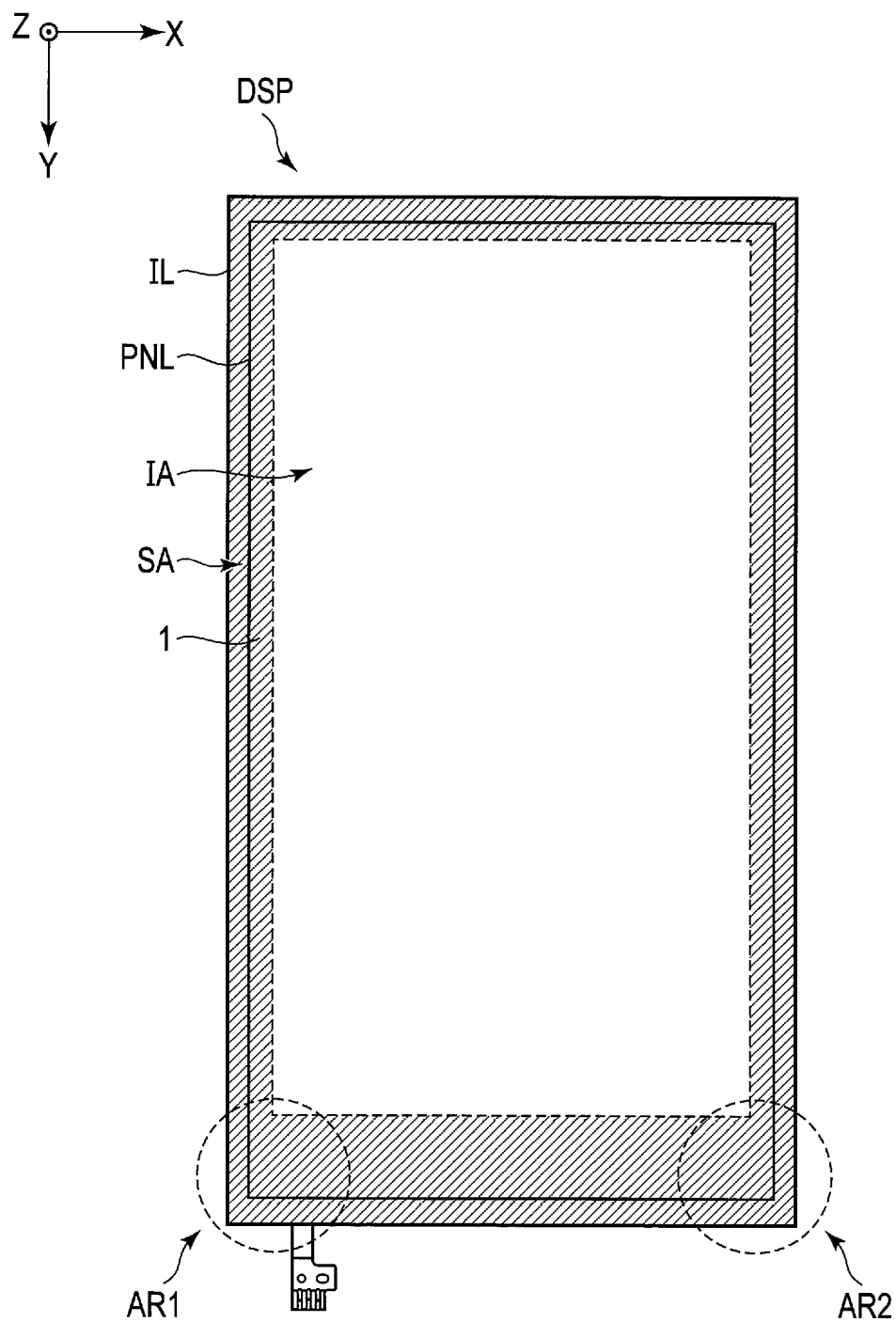
FIG. 1 is a plan view showing a structural example of a display device DSP according to an embodiment.

In general, according to one embodiment, an illumination device includes a light guide, a frame surrounding the light guide, a light emitting unit located between the light guide and the frame, and a wiring substrate electrically connected to the light emitting unit, the wiring substrate includes a convex portion projecting in a first direction as seen in plan view, the frame includes a concave portion facing the convex portion as seen in plan view, and the concave portion is spaced apart from the convex portion.

According to another embodiment, a display device includes an illumination device and a display panel overlapping the illumination device, the illumination device includes a light guide, a frame surrounding the light guide, a light emitting unit located between the light guide and the frame, and a wiring substrate electrically connected to the light emitting unit, the wiring substrate includes a convex portion projecting in a first direction as seen in plan view, the frame includes a concave portion facing the convex portion as seen in plan view, and the concave portion is spaced apart from the convex portion.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a plan view showing a structural example of a display device DSP according to an embodiment. In FIG. 1, a first direction X intersects a second direction Y A third direction Z intersects the first direction X and the second direction Y. For example, the first direction X, the second direction Y and the third direction Z are perpendicular to one another. However, they may intersect one another at an angle other than 90 degrees. The first direction X and the second direction Y are equivalent to directions parallel to the display surface. The third direction Z is equivalent to the thickness direction of the display device DSP. In this specification, the direction of the arrow indicating the third direction Z is referred to as "upward" (or toward the upper side). The opposite direction of the arrow indicating the third direction Z is referred to as "downward" (or toward the lower side). It is assumed that the position at which the display device DSP is observed is present on the point side of the arrow indicating the third direction Z. The observation from this position toward the X-Y plane defined by the first direction X and the second direction Y is referred to as a plan view.

The display device DSP comprises a display panel PNL and an illumination device IL. The illumination device IL comprises an illumination area IA from which light is emitted, and a light-shielding area SA in which a light-shielding layer 1 is provided. The illumination area IA is rectangular. In the example shown in FIG. 1, the illumination area IA has a rectangular shape in which the length in the second direction Y is greater than the length in the first direction X. As indicated with hatch lines in FIG. 1, the light-shielding layer 1 has a frame shape and surrounds the illumination area IA.

For example, the display panel PNL is an active-matrix liquid crystal display panel. The display panel PNL of the present embodiment displays an image by selectively transmitting the light emitted from the illumination device IL. The display panel PNL overlaps the entire illumination area IA and a part of the light-shielding layer 1.

Figure 2:
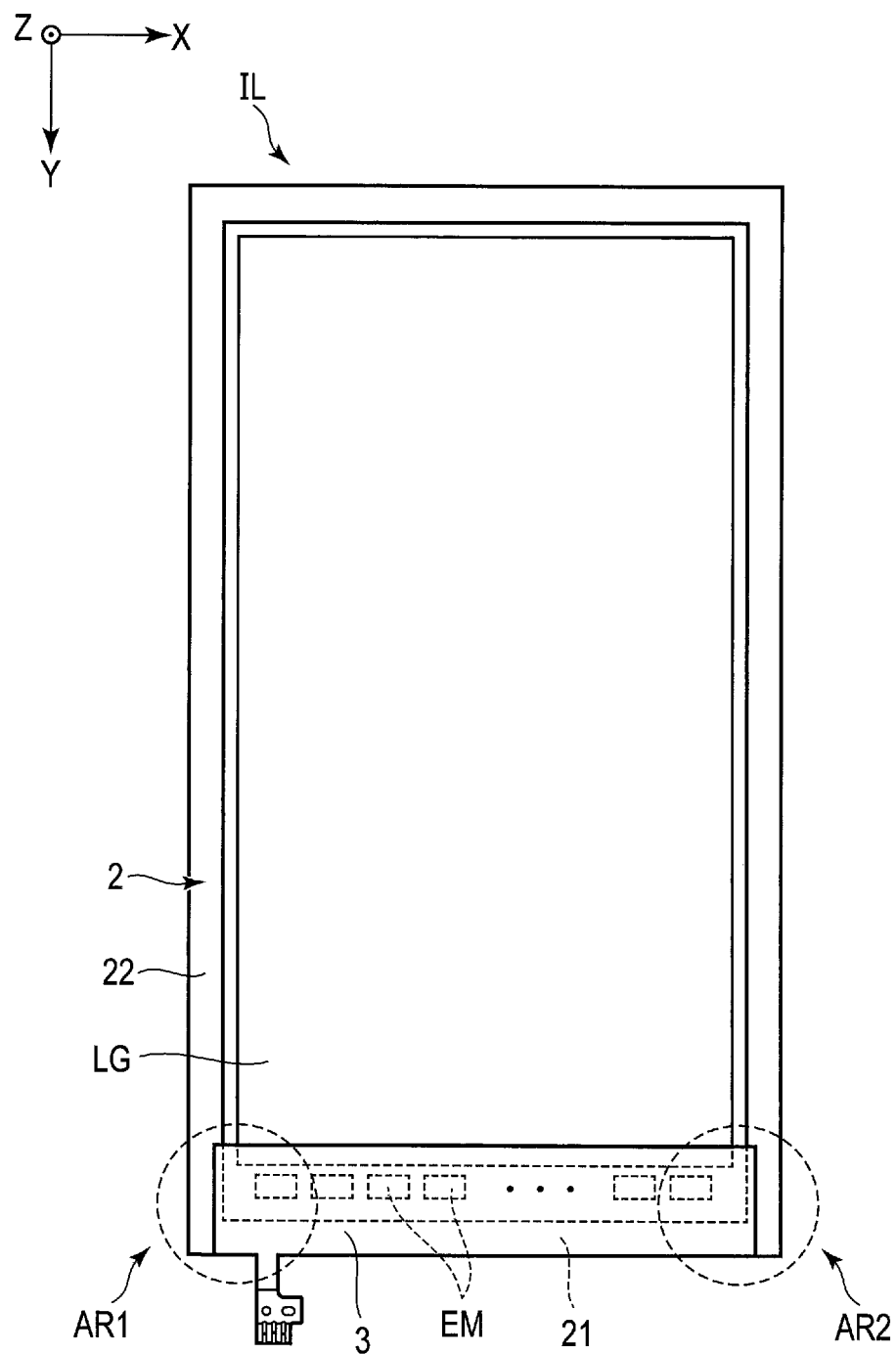
FIG. 2 is a plan view schematically showing the illumination device IL shown in FIG. 1.

FIG. 2 is a plan view schematically showing the illumination device IL shown in FIG. 1. The illumination device IL comprises a frame 2, a wiring substrate 3, light emitting units EM and a light guide LG. The illustration of the light-shielding layer 1 is omitted here.

The frame 2 surrounds the light emitting units EM and the light guide LG. The frame 2 comprises a first portion 21 extending in the first direction X, and a second portion 22 extending in the second direction Y. The light guide LG has a rectangular shape in which the length in the second direction Y is greater than the length in the first direction X. The light guide LG is located in an area substantially corresponding to the illumination area IA. The light emitting units EM are located between the light guide LG and the first portion 21 in the area surrounded by the frame 2. In the example shown in FIG. 2, a plurality of light emitting units EM are arranged in the first direction X. The wiring substrate 3 is electrically connected to the light emitting units EM. In the example shown in FIG. 2, the wiring substrate 3 overlaps the light guide LG, the light emitting units EM and the first portion 21.

Figure 3:
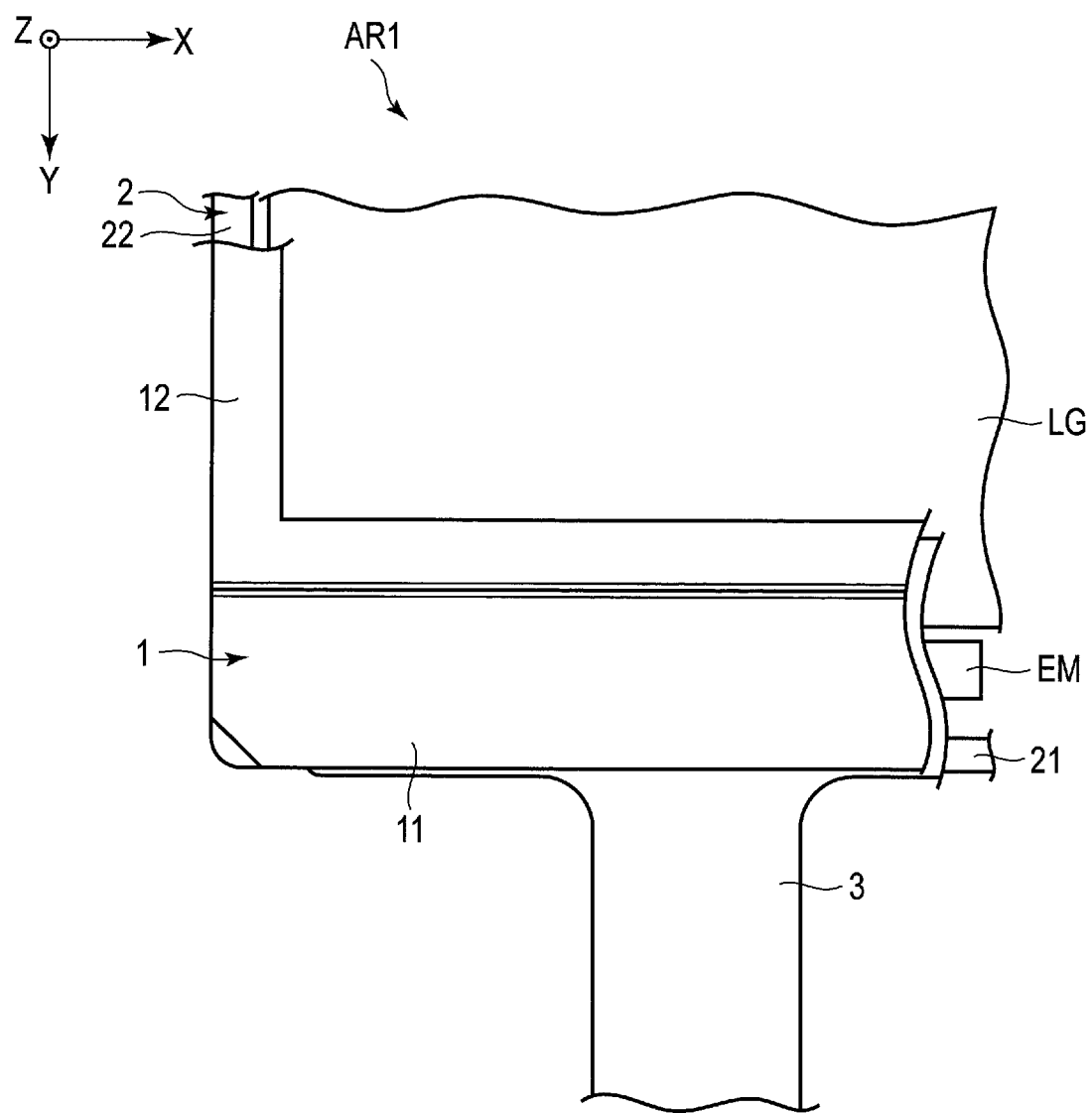
FIG. 3 is a plan view showing the area AR1 surrounded by the dashed circle shown in FIG. 1.
Figure 4:
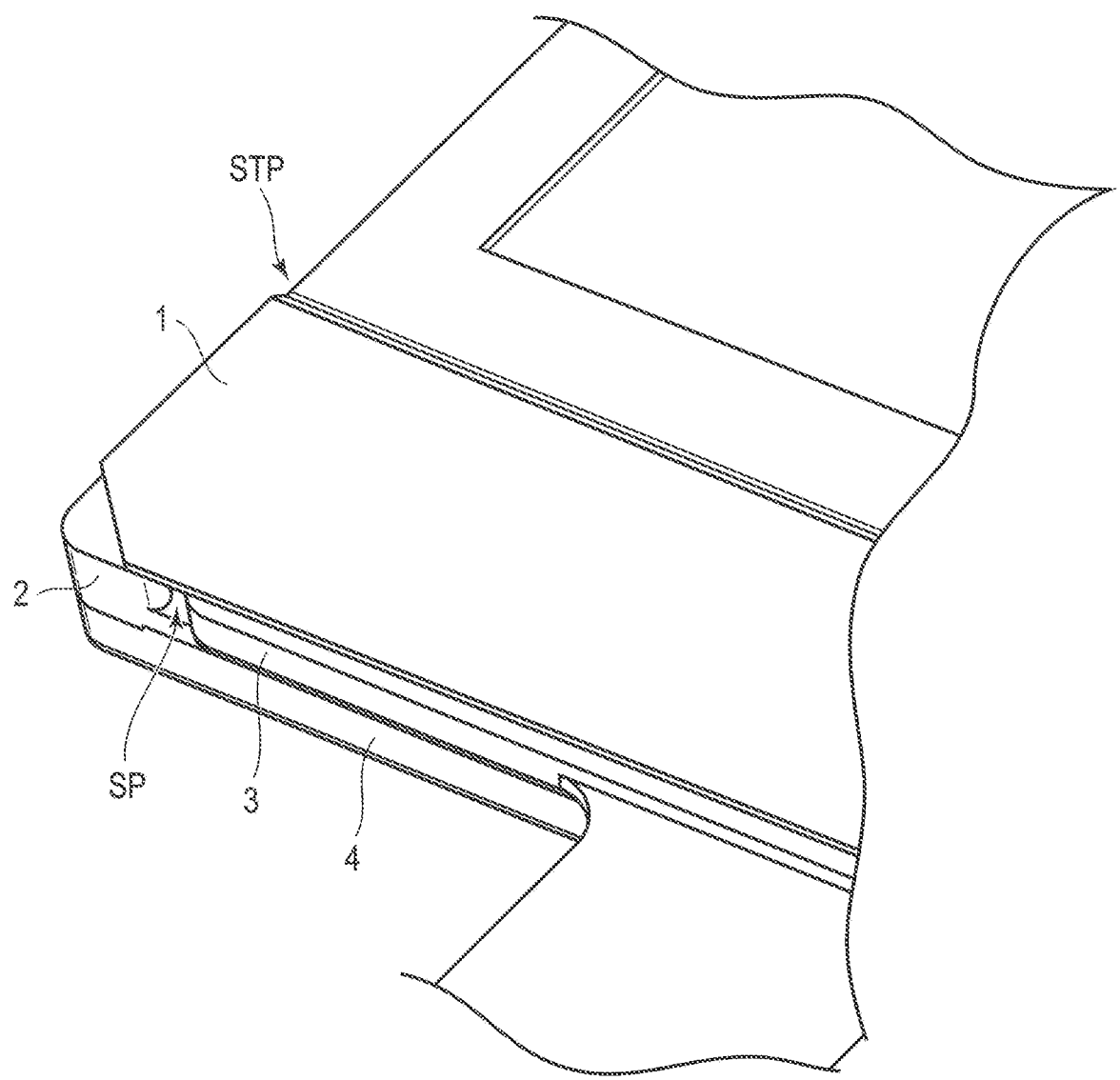
FIG. 4 is a perspective view of the area AR1.

FIG. 3 is a plan view showing the area AR1 surrounded by the dashed circle shown in FIG. 1. FIG. 4 is a perspective view of the area AR1. The illustration of the display panel PNL is omitted here. The structure of an area AR2 is the same as that of the area AR1, explanation thereof being omitted.

As shown in FIG. 3, the light-shielding layer 1 overlaps the frame 2, the light guide LG, the light emitting units EM and the wiring substrate 3. More specifically, the light-shielding layer 1 comprises a first portion 11 extending in the first direction X, and a second portion 12 extending in the second direction Y. The first portion 11 covers the first portion 21 of the frame 2, the light emitting units EM and a part of the light guide LG. The second portion 12 covers the second portion 22 of the frame 2 and a part of the light guide LG. In other words, the gap between the frame 2 and the light guide LG is covered with the light-shielding layer 1.

As shown in FIG. 4, the illumination device IL comprises a housing 4 which holds the light guide LG, the light emitting units EM, etc. A part of the frame 2 and the wiring substrate 3 are located on the housing 4. The frame 2 is spaced apart from the wiring substrate 3. In other words, a space SP surrounded by the frame 2, the wiring substrate 3 and the light-shielding layer 1 is defined. In the example shown in FIG. 4, a step portion STP extending in the first direction X is formed above the housing 4. The light-shielding layer 1 also covers the step portion STP.

Figure 5:
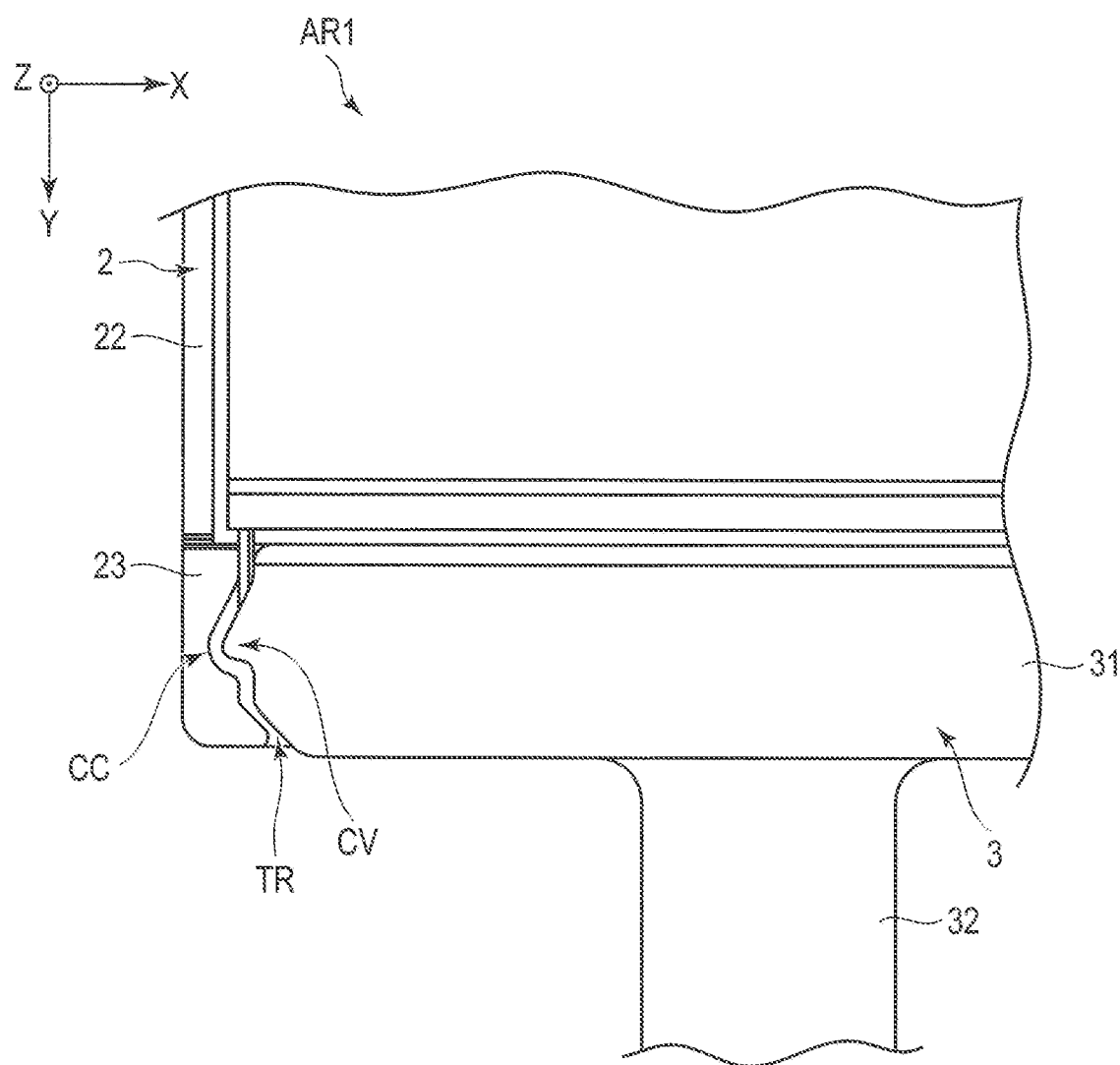
FIG. 5 is a plan view showing the area AR1 in a case where a light-shielding layer 1 is excluded.
Figure 6:
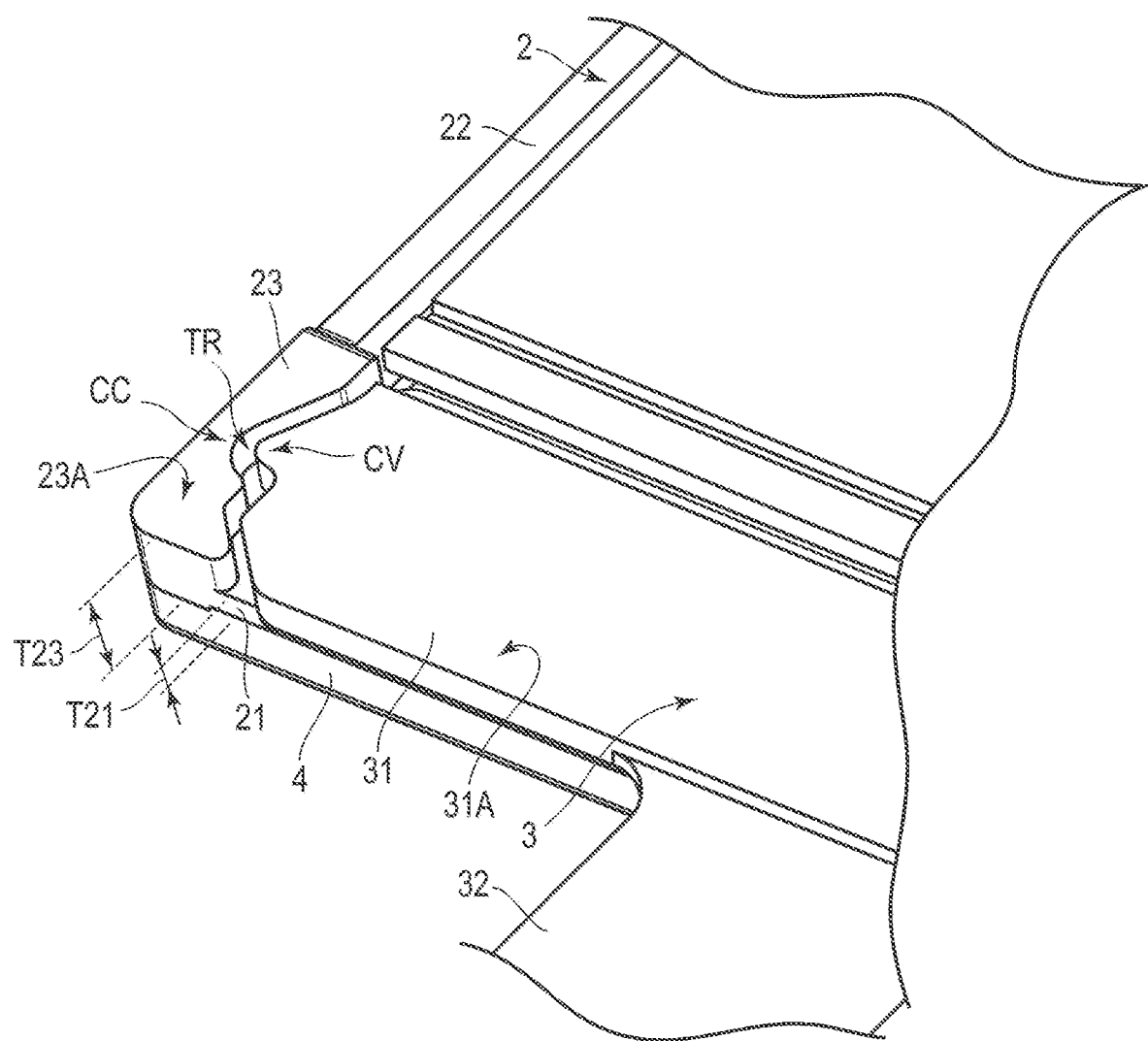
FIG. 6 is a perspective view of the area AR1 in a case where the light-shielding layer 1 is excluded.

FIG. 5 is a plan view showing the area AR1 in a case where the light-shielding layer 1 is excluded. FIG. 6 is a perspective view of the area AR1 in a case where the light-shielding layer 1 is excluded.

As shown in FIG. 5 and FIG. 6, the wiring substrate 3 comprises a connection portion 31 and an extended portion 32. The connection portion 31 extends in the first direction X. Substantially the entire connection portion 31 overlaps the housing 4. The extended portion 32 extends from the connection portion 31 in the second direction Y and does not overlap the housing 4.

The frame 2 comprises a rib 23 located in the vicinity of the intersection of the first portion 21 and the second portion 22. Thickness T23 of the rib 23 is greater than thickness T21 of the first portion 21 and the thickness of the second portion 22. In the example shown in FIG. 6, the height of the upper surface 23A of the rib 23 is substantially aligned with the height of the upper surface 31A of the connection portion 31. Here, the height corresponds to a position in the third direction Z.

The connection portion 31 and the rib 23 are arranged in the first direction X. The connection portion 31 comprises a convex portion CV projecting in the first direction X. In the example shown in FIG. 5 and FIG. 6, the convex portion CV projects toward the rib 23 (in other words, toward the external side of the frame 2). The rib 23 comprises a concave portion CC facing the convex portion CV. The convex portion CV is spaced apart from the concave portion CC. In this way, a meandering trench TR is formed between the connection portion 31 and the rib 23.

FIG. 7 is a plan view in which the vicinity of the rib 23 and the connection portion 31 shown in FIG. 5 is enlarged.

The connection portion 31 comprises edges EX3$a$ and EX3$b$ extending in the first direction X, and an edge ET3 facing the rib 23. The edge EX3$a$ is located inside the area surrounded by the frame 2. The edge EX3$b$ is located outside the area surrounded by the frame 2.

The first portion 21 of the frame 2 comprises edges EX2$a$ and EX2$b$ extending in the first direction X. The edge EX2$a$ is located on the internal side in comparison with the edge EX2$b$, in other words, on a side close to the light emitting units EM. The second portion 22 of the frame 2 comprises edges EY2$a$ and EY2$b$ extending in the second direction Y. The edge EY2$a$ is located on the internal side in comparison with the edge EY2$b$, in other words, on a side close to the light guide LG.

The rib 23 of the frame 2 comprises an edge EX23 extending in the first direction X, an edge EY23 extending in the second direction Y, and an edge ET2 facing the connection portion 31. The trench TR corresponds to an area between the edge ET2 and the edge ET3. In the example shown in FIG. 7, the edge EX23 is matched with the edge EX2$b$ of the first portion 21. The edge EY23 is matched with the edge EY2$b$ of the second portion 22. For example, length L23 of the rib 23 in the second direction Y is less than or equal to 2.0 mm. The area of the upper surface 23A of the rib 23 is greater than or equal to 0.9 mm$^2$ and less than or equal to 1.0 mm$^2$. The strength of the rib 23 can be secured by setting length L23 and the area of the upper surface 23A in the above manner.

The connection portion 31 overlaps the light emitting units EM, the light guide LG and the frame 2. More specifically, the connection portion 31 overlaps the light emitting units EM, an edge ELG of the light guide LG, the edges EX2a and EX2b of the first portion 21, and the edge EY2a of the second portion 22. The edge EX3a, the edge ELG, the light emitting units EM, the edge EX2a, the edge EX2b and the edge EX3b are arranged in this order in the second direction Y. The edge ET3 intersects the edge EY2a. Thus, a part of the convex portion CV overlaps the frame 2.

In the example shown in FIG. 7, a reflective layer RL as described later is provided under the light guide LG. The connection portion 31 also overlaps the housing 4 exposed between the reflective layer RL and the second portion 22.

FIG. 8 is a plan view in which the vicinity of the trench TR shown in FIG. 7 is enlarged. FIG. 8 shows the upper surface 31A of the connection portion 31 and the upper surface 23A of the rib 23.

The edge ET3 of the connection portion 31 includes portions S31, S32, S33, S34, S35 and S36. The portions S31, S32, S33, S34, S35 and S36 are arranged in this order from the area surrounded by the frame 2 toward the outside, in other words, in a direction from the edge EX3a toward the edge EX3b.

The portions S32, S33 and S34 are located on the rib 23 side in comparison with the portions S31, S35 and S36, and form the convex portion CV. The portion S33 is curved so as to project toward the rib 23. For example, radius of curvature R33 of the portion S33 is greater than or equal to 0.1 mm. For example, length LCV of the convex portion CV is equivalent to the distance in the first direction X between the position closest to the rib 23 in the portion S33 and the portion S35. For example, length LCV is greater than or equal to 0.3 mm.

For example, the portions S31, S32, S34, S35 and S36 linearly extend. In the example shown in FIG. 8, the portion S31 and the portion S35 extend in the second direction Y. The portions S32, S34 and S36 extend in a direction intersecting the second direction Y. The portion S35 is located on the rib 23 side in comparison with the portion S36. For example, angle θ1 between the portion S31 and the portion S32 is greater than or equal to 20 degrees. For example, angle θ2 between the portion S34 and the portion S35 is greater than or equal to 80 degrees.

The edge ET2 of the rib 23 includes portions S21, S22, S23, S24, S25 and S26. The portions S21, S22, S23, S24, S25 and S26 face the portions S31, S32, S33, S34, S35 and S36 of the edge ET3, respectively, and are arranged in this order.

The portions S22, S23 and S24 are closer to the edge EY23 than the portions S21, S25 and S26, and form the concave portion CC. The portion S23 is curved so as to project toward the edge EY23. For example, the radius of curvature of the portion S23 is greater than radius of curvature R33. The portions S21, S22, S24, S25 and S26 extend substantially parallel to the portions S31, S32, S34, S35 and S36, respectively.

In the second direction Y, the trench TR on the edge EX3b side is narrower than the trench TR on the edge EX3a side. In other words, interval IT1 between the portion S36 and the rib 23 is less than interval IT2 between the portion S33 and the rib 23. In the example shown in FIG. 8, interval IT1 is equivalent to the distance in a direction orthogonal to the extension direction of the portion S36 between the portion S36 and the portion S26. Interval IT2 is equivalent to the distance between the portion S33 and the portion S23. For example, interval IT1 is greater than or equal to 0.08 mm. For example, interval IT2 is greater than or equal to 0.15 mm.

The shape of the edge ET3 or ET2 is not limited to the example shown in FIG. 8. For example, the edge ET3 should comprise at least one convex portion. The number of curves and straight lines included in the edge ET3, the shapes of the curves, or the extension directions of the straight lines may be arbitrarily changed.

Figure 9:
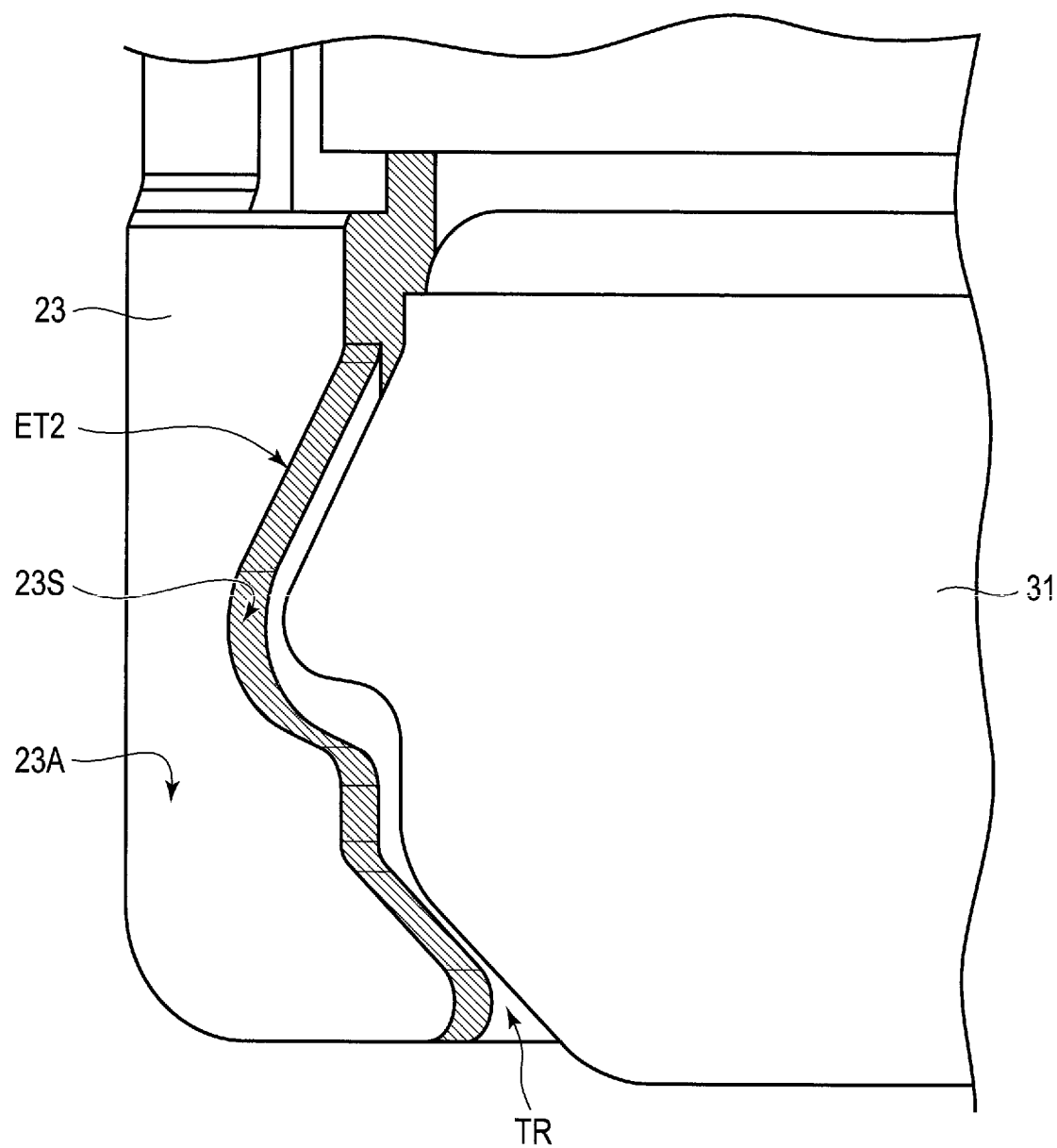
FIG. 9 is a perspective view showing the vicinity of the trench TR.
Figure 10:
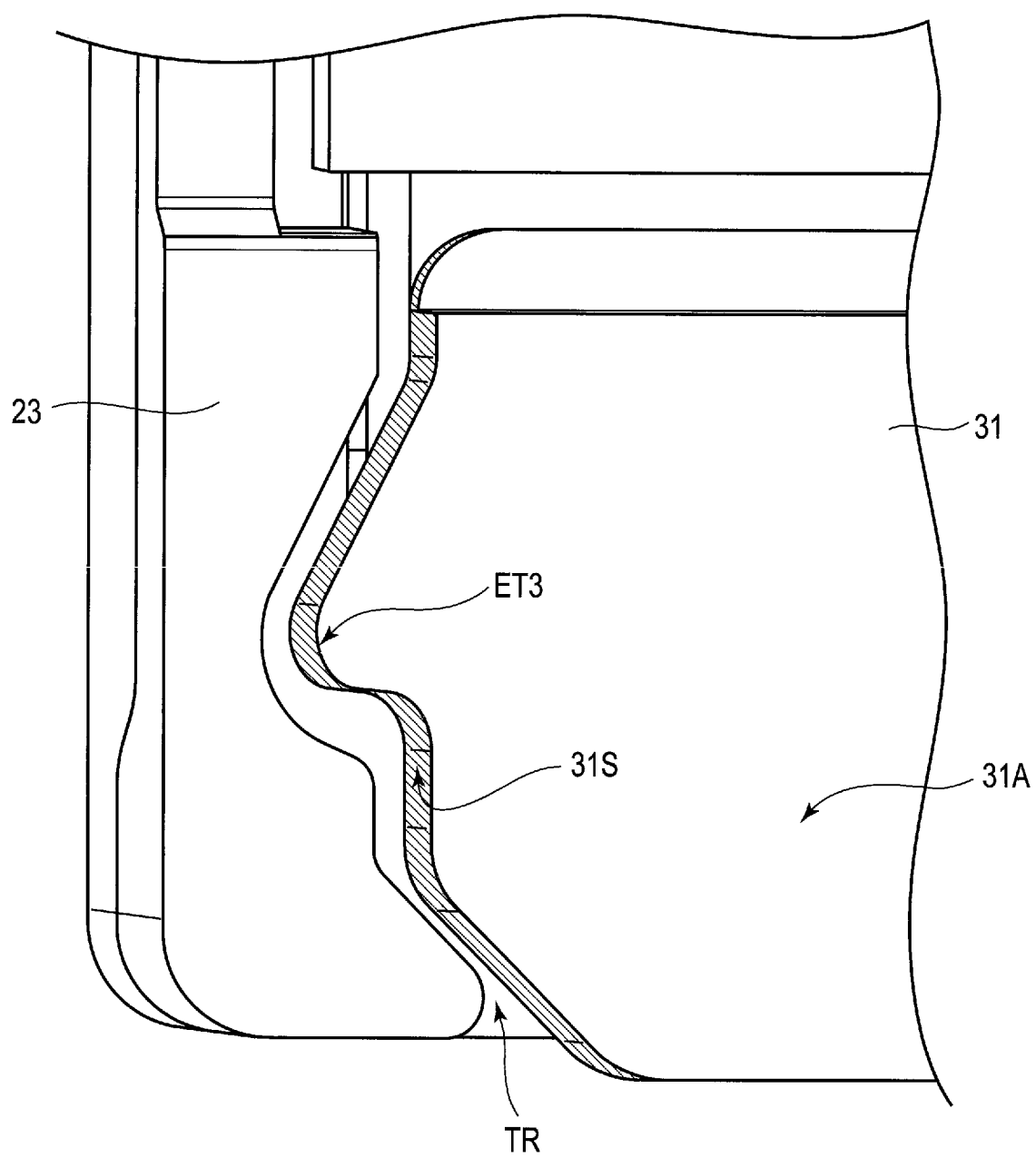
FIG. 10 is a perspective view showing the vicinity of the trench TR.

FIG. 9 and FIG. 10 are perspective views showing the vicinity of the trench TR. As indicated with hatch lines in FIG. 9, the rib 23 comprises a side surface 23S facing the connection portion 31 and forming the trench TR. The edge ET2 corresponds to the boundary between the upper surface 23A and the side surface 23S of the rib 23. As indicated with hatch lines in FIG. 10, the connection portion 31 comprises a side surface 31S facing the rib 23 and forming the trench TR. The edge ET3 corresponds to the boundary between the upper surface 31A and the side surface 31S of the connection portion 31.

Figure 11:
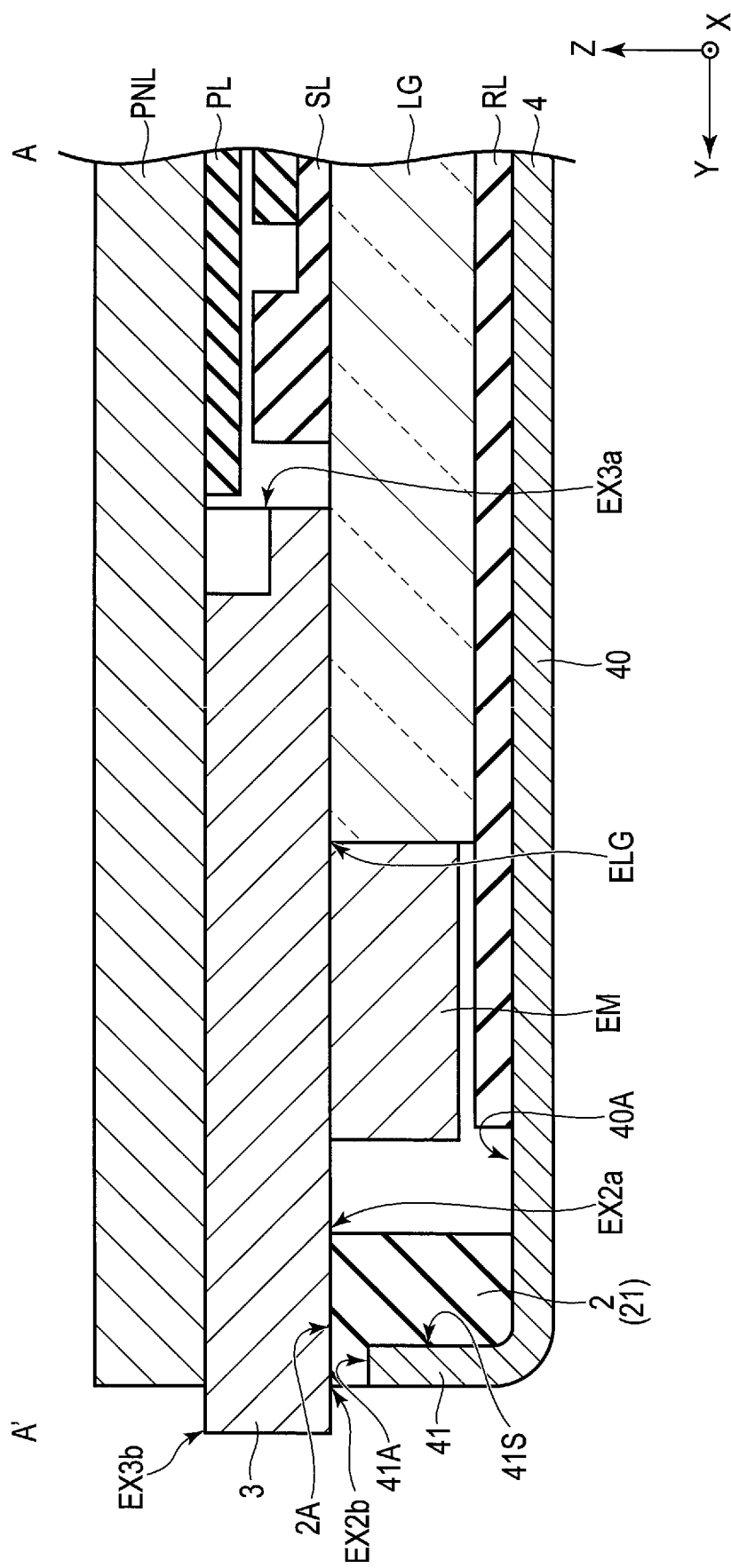
FIG. 11 is a cross-sectional view taken along the line A-A' of FIG. 7.
Figure 12:
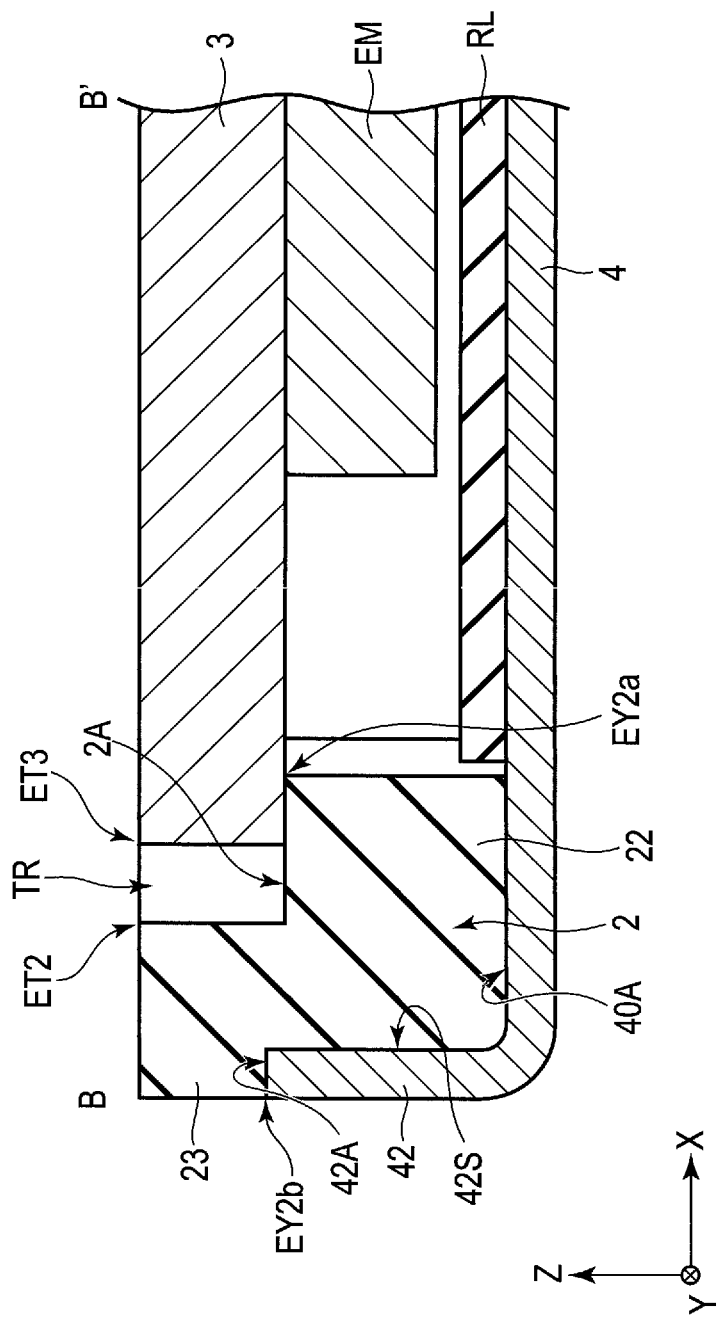
FIG. 12 is a cross-sectional view taken along the line B-B' of FIG. 7.

FIG. 11 is a cross-sectional view taken along the line A-A' of FIG. 7. FIG. 12 is a cross-sectional view taken along the line B-B' of FIG. 7. FIG. 11 shows the edges EX2a, EX2b, EX3a, EX3b and ELG shown in FIG. 8. FIG. 12 shows the edges EY2a, EY2b, ET2 and ET3 shown in FIG. 8.

As shown in FIG. 11 and FIG. 12, the display device DSP comprises the frame 2, the wiring substrate 3, the housing 4, the light emitting units EM, the light guide LG, the reflective layer RL, a scattering layer SL, a polarizer PL and the display panel PNL.

The housing 4 comprises a bottom wall 40 and sidewalls 41 and 42. The frame 2 fits with the housing 4. More specifically, the frame 2 is in contact with the upper surface 41A of the sidewall 41 and the upper surface 42A of the sidewall 42. In the example shown in FIG. 11, the first portion 21 is in contact with a side surface 41S of the sidewall 41 and the bottom surface 40A of the housing 4. In the example shown in FIG. 12, the second portion 22 is in contact with a side surface 42S of the sidewall 42 and the bottom surface 40A.

The light emitting units EM, the light guide LG and the reflective layer RL are housed in the housing 4. The reflective layer RL is located immediately under the light emitting units EM and the light guide LG. The reflective layer RL overlaps at least the entire light guide LG. In the example shown in FIG. 11, the reflective layer RL is in contact with the lower surface of the light guide LG (in other words, the surface facing the bottom surface 40A).

The wiring substrate 3 is located on the frame 2, the light emitting units EM and the light guide LG. The light emitting units EM are electrically connected to the wiring substrate 3. The wiring substrate 3 is in contact with the upper surface 2A of the frame 2. In the example shown in FIG. 11, the wiring substrate 3 is in contact with the light guide LG. However, an adhesive layer may be interposed between the wiring substrate 3 and the light guide LG. As shown in FIG. 12, the wiring substrate 3 is spaced apart from the rib 23 and forms the trench TR with the rib 23.

Returning to FIG. 11, the scattering layer SL is located on the light guide LG in an internal area in comparison with the wiring substrate 3 in the second direction Y. The display panel PNL is located on the wiring substrate 3. The polarizer PL is located between the display panel PNL and the scattering layer SL.

Figure 13:
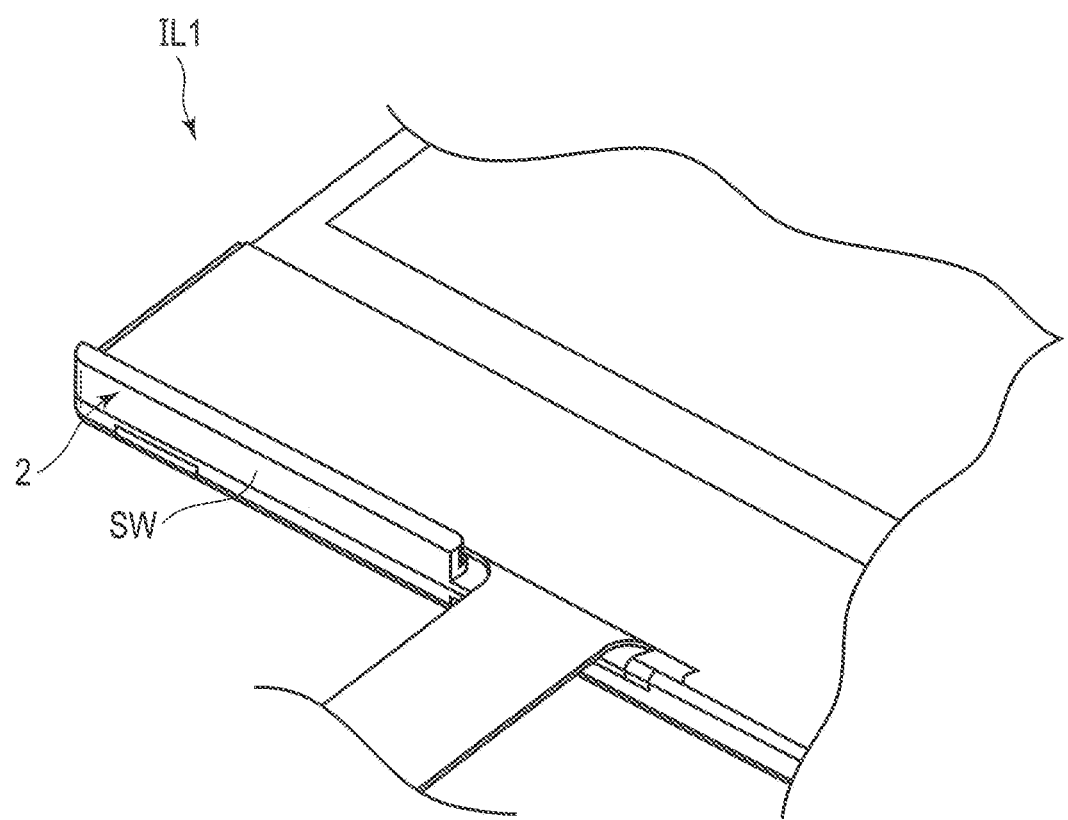
FIG. 13 shows an illumination device IL1 as a first comparative example.
Figure 14:
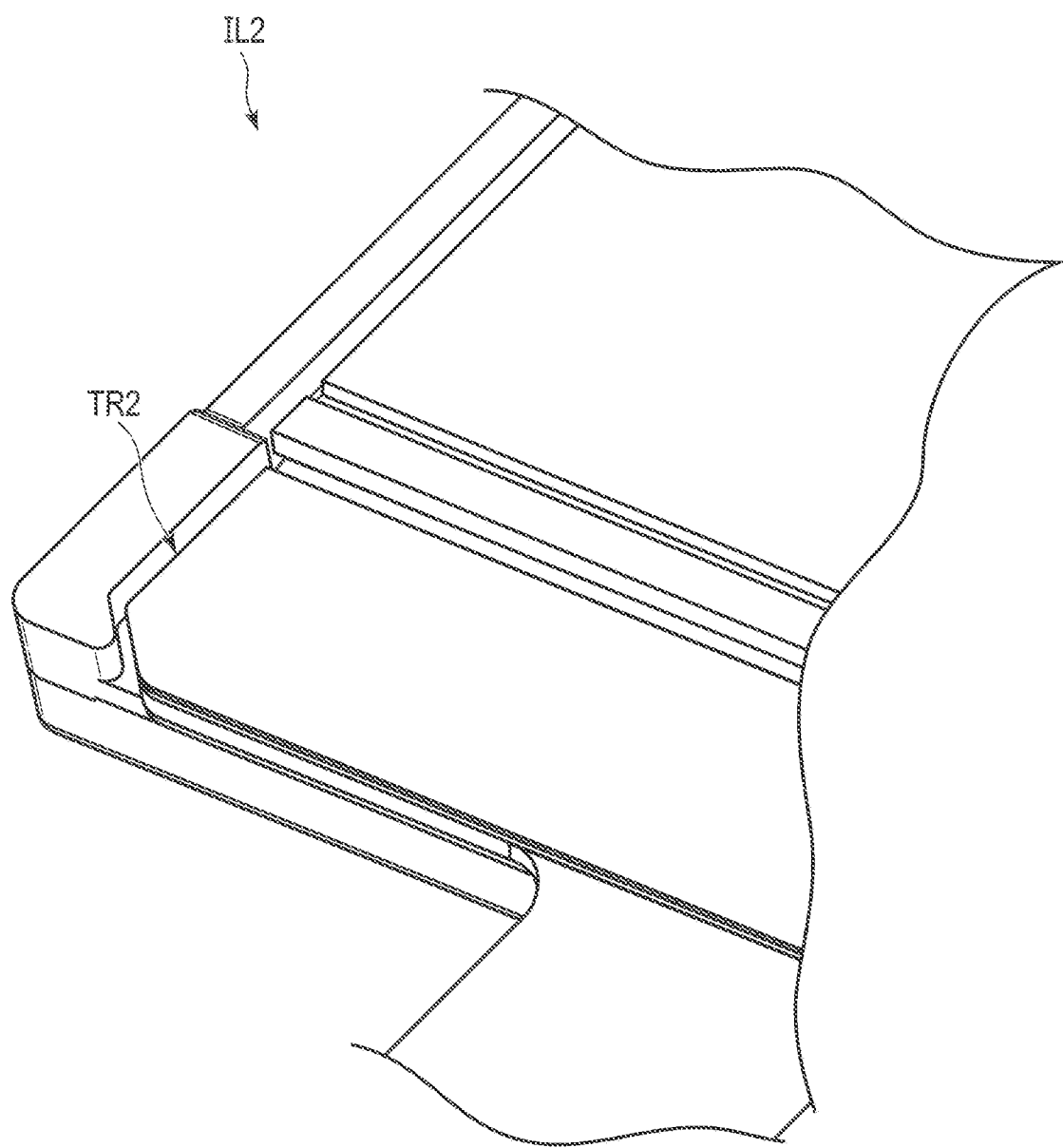
FIG. 14 shows an illumination device IL2 as a second comparative example.

FIG. 13 shows an illumination device IL1 as a first comparative example. The first comparative example is different from the present embodiment in respect that the frame 2 comprises a sidewall SW extending in the first direction X. FIG. 14 shows an illumination device IL2 as a second comparative example. The second comparative example is different from the present embodiment in respect that the illumination device IL2 comprises a trench TR2 extending in substantially a linear fashion.

In the present embodiment, the frame 2 does not comprise a sidewall. Thus, the length of the frame of the illumination device in the second direction Y is reduced in comparison with the first comparative example. Thus, the size of the frame of the display device DSP can be reduced.

In the present embodiment, the connection portion 31 comprises the convex portion CV projecting toward the rib 23, and the rib 23 comprises the concave portion CC facing the convex portion CV. Even when the rib 23 is spaced apart from the connection portion 31 because of the accuracy of alignment of the frame 2 and the wiring substrate 3, the meandering trench TR is formed between the rib 23 and the connection portion 31. In this way, in comparison with the second comparative example, the trench TR meanders, and the length is increased. Thus, it is possible to prevent the entering of a foreign substance from the outside upon the inside of the frame 2. Interval IT1 between the rib 23 and the connection portion 31 on the edge EX3b side is less than interval IT2 between the rib 23 and the connection portion 31 on the internal side in comparison with the edge EX3b. In this manner, the entering of a foreign substance can be further prevented.

As described above, in the present embodiment, it is possible to prevent the entering of a foreign substance upon the inside of the illumination device while the size of the frame is reduced. The reliability of the illumination device IL can be improved. As a result, the reliability of the display device DSP can be improved.

In the present embodiment, length LCV corresponds to a first length, and length L23 corresponds to a second length. The portion S31 of the edge ET3 corresponds to a first portion. The portion S32 corresponds to a second portion. The portion S33 corresponds to a third portion. The portion S34 corresponds to a fourth portion. The portion S35 corresponds to a fifth portion. The portion S36 corresponds to a sixth portion. Angle θ1 corresponds to a first angle. Angle θ2 corresponds to a second angle. Interval IT1 corresponds to a first interval. Interval IT2 corresponds to a second interval.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device for a display device comprising:
a light guide;
a frame surrounding the light guide;
a light emitting unit located between the light guide and the frame; and
a wiring substrate electrically connected to the light emitting unit, wherein
the wiring substrate comprises a convex portion projecting in a first direction as seen in plan view,
the frame comprises a concave portion facing the convex portion in the first direction as seen in plan view, and
the convex portion and the concave portion are spaced apart from each other and form a trench which communicates with an outside of the illumination device.

2. The illumination device of claim 1, wherein
a first length of the convex portion in the first direction is greater than or equal to 0.3 mm.

3. The illumination device of claim 1, wherein
the frame comprises a rib including the concave portion, and
the rib and the wiring substrate are arranged in the first direction.

4. The illumination device of claim 3, wherein
a second length of the rib in a second direction intersecting the first direction is less than or equal to 2.0 mm, and
an area of an upper surface of the rib is greater than or equal to 0.9 mm2 and less than or equal to 1.0 mm2.

5. The illumination device of claim 3, wherein
the wiring substrate comprises an edge including the convex portion,
the edge includes a first portion, a second portion, a third portion, a fourth portion, a fifth portion and a sixth portion,
the first portion, the second portion, the third portion, the fourth portion, the fifth portion and the sixth portion are arranged in this order from inside to outside of the frame, and
the second portion, the third portion and the fourth portion form the convex portion located on the rib side in comparison with the first portion, the fifth portion and the sixth portion.

6. The illumination device of claim 5, wherein
the third portion is curved so as to project toward the rib, and
a radius of curvature of the third portion is greater than or equal to 0.1 mm.

7. The illumination device of claim 5, wherein
the first portion and the second portion linearly extend, and
a first angle between the first portion and the second portion is greater than or equal to 20 degrees.

8. The illumination device of claim 5, wherein
the fourth portion and the fifth portion linearly extend, and
a second angle between the fourth portion and the fifth portion is greater than or equal to 80 degrees.

9. The illumination device of claim 5, wherein
a first interval between the sixth portion and the rib is less than a second interval between the third portion and the rib.

10. The illumination device of claim 9, wherein
the first interval is greater than or equal to 0.08 mm, and
the second interval is greater than or equal to 0.15 mm.

11. A display device comprising:
an illumination device; and
a display panel overlapping the illumination device, wherein
the illumination device comprises:
a light guide;
a frame surrounding the light guide;
a light emitting unit located between the light guide and the frame; and
a wiring substrate electrically connected to the light emitting unit,
the wiring substrate comprises a convex portion projecting in a first direction as seen in plan view, the frame comprises a concave portion facing the convex portion in the first direction as seen in plan view, and the convex portion and the concave portion are spaced apart from each other and form a trench which communicates with an outside of the illumination device.

12. The display device of claim 11, wherein
a first length of the convex portion in the first direction is greater than or equal to 0.3 mm.

13. The display device of claim 11, wherein
the frame comprises a rib including the concave portion, and the rib and the wiring substrate are arranged in the first direction.

14. The display device of claim 13, wherein
a second length of the rib in a second direction intersecting the first direction is less than or equal to 2.0 mm, and an area of an upper surface of the rib is greater than or equal to 0.9 mm2 and less than or equal to 1.0 mm2.

15. The display device of claim 13, wherein
the wiring substrate comprises an edge including the convex portion, the edge includes a first portion, a second portion, a third portion, a fourth portion, a fifth portion and a sixth portion, the first portion, the second portion, the third portion, the fourth portion, the fifth portion and the sixth portion are arranged in this order from inside to outside of the frame, and the second portion, the third portion and the fourth portion form the convex portion located on the rib side in comparison with the first portion, the fifth portion and the sixth portion.

16. The display device of claim 15, wherein
the third portion is curved so as to project toward the rib, and a radius of curvature of the third portion is greater than or equal to 0.1 mm.

17. The display device of claim 15, wherein
the first portion and the second portion linearly extend, and a first angle between the first portion and the second portion is greater than or equal to 20 degrees.

18. The display device of claim 15, wherein
the fourth portion and the fifth portion linearly extend, and a second angle between the fourth portion and the fifth portion is greater than or equal to 80 degrees.

19. The display device of claim 15, wherein
a first interval between the sixth portion and the rib is less than a second interval between the third portion and the rib.

20. The display device of claim 19, wherein
the first interval is greater than or equal to 0.08 mm, and the second interval is greater than or equal to 0.15 mm.

* * * * *